United States Patent
Liu et al.

(10) Patent No.: US 10,902,841 B2
(45) Date of Patent: Jan. 26, 2021

(54) PERSONALIZED CUSTOM SYNTHETIC SPEECH

(71) Applicant: International Business Machines Corporation, Armonk, NY (US)

(72) Inventors: Su Liu, Austin, TX (US); Eric J. Rozner, Boulder, CO (US); Inseok Hwang, Austin, TX (US); Chungkuk Yoo, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 16/276,869

(22) Filed: Feb. 15, 2019

(65) Prior Publication Data

US 2020/0265829 A1    Aug. 20, 2020

(51) Int. Cl.
| | | |
|---|---|---|
| *G10L 15/22* | (2006.01) | |
| *G10L 15/26* | (2006.01) | |
| *G10L 13/00* | (2006.01) | |
| *G10L 13/04* | (2013.01) | |
| *G10L 25/63* | (2013.01) | |
| *G10L 15/16* | (2006.01) | |

(52) U.S. Cl.
CPC .............. *G10L 13/04* (2013.01); *G10L 15/16* (2013.01); *G10L 15/26* (2013.01); *G10L 25/63* (2013.01)

(58) Field of Classification Search
CPC ................................ G10L 15/26; G10L 13/00
See application file for complete search history.

(56) References Cited

U.S. PATENT DOCUMENTS

| | | | |
|---|---|---|---|
| 5,642,470 A | | 6/1997 | Yamamoto et al. |
| 5,933,805 A | * | 8/1999 | Boss .................... G10L 19/0018 |
| | | | 704/207 |
| 6,334,103 B1 | | 12/2001 | Surace et al. |
| 6,415,257 B1 | | 7/2002 | Junqua et al. |
| 7,483,832 B2 | | 1/2009 | Tischer |
| 7,523,036 B2 | | 4/2009 | Akabane et al. |

(Continued)

OTHER PUBLICATIONS

Disclosed Anonymously, "Assistive Technologies Using Touch, Voice, and Multi-Modal Input for Users With Disabilities or Impairments", An IP.com Prior Art Database Technical Disclosure, IP.com No. IPCOM000238038D, IP.com Electronic Publication Date: Jul. 28, 2014, 13 pages.

(Continued)

*Primary Examiner* — Shreyans A Patel
(74) *Attorney, Agent, or Firm* — Christopher M. Pignato

(57) ABSTRACT

Systems, methods, and computer program products customizing and delivering contextually relevant, artificially synthesized, voiced content that is targeted toward the individual user behaviors, viewing habits, experiences and preferences of each individual user accessing the content of a content provider. A network accessible profile service collects and analyzes collected user profile data and recommends contextually applicable voices based on the user's profile data. As user input to access voiced content or triggers voiced content maintained by a content provider, the voiced content being delivered to the user is a modified version comprising artificially synthesized human speech mimicking the recommended voice and delivering the dialogue of the voiced content, in a manner that imitates the sounds and speech patterns of the recommended voice.

20 Claims, 7 Drawing Sheets

(56) References Cited

U.S. PATENT DOCUMENTS

| | | | |
|---|---|---|---|
| 8,234,119 B2 | 7/2012 | Dhawan et al. | |
| 8,401,859 B2 | 3/2013 | Dhawan et al. | |
| 10,303,428 B2* | 5/2019 | Yang | G06F 3/165 |
| 2002/0184032 A1 | 12/2002 | Hisaminato et al. | |
| 2003/0028377 A1 | 2/2003 | Noyes | |
| 2007/0100628 A1 | 5/2007 | Bodin et al. | |
| 2007/0118378 A1 | 5/2007 | Skuratovsky | |
| 2007/0276666 A1 | 11/2007 | Rosec et al. | |
| 2011/0093272 A1* | 4/2011 | Isobe | G10L 13/10 |
| | | | 704/258 |
| 2015/0120293 A1* | 4/2015 | Wohlert | G10L 21/0364 |
| | | | 704/235 |
| 2017/0243582 A1* | 8/2017 | Menezes | G10L 13/033 |
| 2017/0244834 A1 | 8/2017 | Flores et al. | |

OTHER PUBLICATIONS

Disclosed Anonymously et al., "Automated speech pattern generator for natural language output", An IP.com Pr ior Art Database Technical Disclosure, IP.com No. IPCOM000254624D, IP.com Electronic Publication Date: Jul. 18, 2018, 8 pages.

Disclosed Anonymously, "Service for Session-Level Voice Normalization", An IP.com Prior Art Database Technical Disclosure, IP.com No. IPCOM000212411D, IP.com Electronic Publication Date: Nov. 10, 2011, 5 pages.

Mehri et al., "SAMPLERNN: An Unconditional End-to-End Neural Audio Generation Model", Published as a conference paper at ICLR 2017, 11 pages.

Mell et al., "The NIST Definition of Cloud Computing", Recommendations of the National Institute of Standards and Technology, NIST Special Publication 800-145, Sep. 2011, 7 pages.

Metze et al., "A Review of Personality in Voice-Based Man Machine Interaction", Language Technologies Institute, School of Computer Science, Carnegie Mellon University Research Showcase @ CMU, Published in Lecture Notes in Computer Science, 6762, 358-367, Jul. 2011, 11 pages.

Song et al., "Customization of IBM Intu's Voice by Connecting Text-to-Speech Services with a Voice Conversion Network", Proceedings of the 51st Hawaii International Conference on System Sciences | 2018, ISBN: 978-0-9981331-1-9 (CC BY-NC-ND 4.0), 10 pages, <http://hdl.handle.net/10125/49991>.

Van Den Oord et al., "Wavenet: A Generative Model for Raw Audio", Sep. 19, 2016, 15 pages.

"Adobe Voco", Wikipedia, Last edited on Oct. 19, 2018, at 18:31, 2 pages, <https://en.wikipedia.org/wiki/Adobe_Voco>.

"Two-Way Voice Recognition Instant Messenger (VRIM) with Network Voice Conversion Flexibility", An IP.com Prior Art Database Technical Disclosure, IP.com No. IPCOM000023999D, IP.com Electronic Publication Date: Apr. 1, 2004, Sony Corporation; Sony Electronics Inc., 10 pages.

"How to export and import a User Profile in Dragon NaturallySpeaking" Nuance, Answer ID 6874 | Published Jul. 6, 2012 05:36 PM | Updated Mar. 30, 2018 12:44 PM, <http://nuance.custhelp.com/app/answers/detail/a_id/6874/~/how-to-export-and-import-a-user-profile-in-dragon-naturallyspeaking>, 6 pages.

Brautigam, Bert, "The New Skeuomorphism is in Your Voice Assistant", Apr. 29, 2017, 5 pages, <https://uxdesign.cc/the-new-skeuomorphism-is-in-your-voice-assistant-3b14a6553a0e>.

* cited by examiner

PERSONALIZED CUSTOM SYNTHETIC SPEECH

TECHNICAL FIELD

The present disclosure relates generally to the field of natural language processing and more specifically to contextually generated synthetic speech.

BACKGROUND

In the field of information technology (IT), a neural network can be described as a system of hardware and/or software that is patterned after the operation of the neurons in the human brain. Artificial neural networks comprise one variety of deep learning technologies that fall within the field of artificial intelligence. Applications of artificial neural networks and other deep learning technologies often focus on solving problems that are complex, including problems pertaining to signal processing or pattern recognition, such as speech-to-text transcription, weather prediction and facial recognition.

Neural networks can be arranged to include a plurality of computer processors organized into tiers and operating in parallel with one another. The first tier of processors receives raw input data while each successive tier of processors receives the output from the processing tier that precedes it. The final tier of processors produces the output for the entire neural network system. Neural networks are flexible and adaptive, they learn by emulating the learning approach of humans. As the amount of data experienced by the neural network increases, the network can modify its behavior. Most neural network learn from training using large quantities of data being fed to the network along with the correct output. Once the neural network has undergone the training phase, the network may subsequently solve actual problems based on the training data, while continuing to refine the neural network's logic based on the new problem-solving data being received.

SUMMARY

A first embodiment of the present disclosure provides a computer-implemented method comprising the steps of receiving a request to deliver voiced content to a user; analyzing user profile data associated with the user; recommending a voice based on analysis of the user profile, wherein the recommended voice is contextually applicable to the user; transcribing the voiced content into text; conditioning a neural network using a voice sample of the recommended voice to synthesize a waveform comprising artificial speech reciting the text of the voiced content in an artificially created voice indistinguishable from the recommended voice; synthesizing a modified version of the voiced content comprising the waveform; and delivering the modified version of the voiced content to the user.

A second embodiment of the present disclosure provides a computer system comprising a processor; and a computer-readable storage media coupled to a processor, wherein the computer readable storage media contains program instructions executing a computer-implemented method comprising the steps of: receiving a request to deliver voiced content to a user; analyzing user profile data associated with the user; recommending a voice based on analysis of the user profile, wherein the recommended voice is contextually applicable to the user; transcribing the voiced content into text; conditioning a neural network using a voice sample of the recommended voice to synthesize a waveform comprising artificial speech reciting the text of the voiced content in an artificially created voice indistinguishable from the recommended voice; synthesizing a modified version of the voiced content comprising the waveform; and delivering the modified version of the voiced content to the user.

A third embodiment of the present disclosure provides a computer program product comprising one or more computer readable storage media having computer-readable program instructions stored on the one or more computer readable storage media, said program instructions executes a computer-implemented method comprising the steps of: receiving a request to deliver voiced content to a user; analyzing user profile data associated with the user; recommending a voice based on analysis of the user profile, wherein the recommended voice is contextually applicable to the user; transcribing the voiced content into text; conditioning a neural network using a voice sample of the recommended voice to synthesize a waveform comprising artificial speech reciting the text of the voiced content in an artificially created voice indistinguishable from the recommended voice; synthesizing a modified version of the voiced content comprising the waveform; and delivering the modified version of the voiced content to the user.

DETAILED DESCRIPTION

Overview

Figure 1:
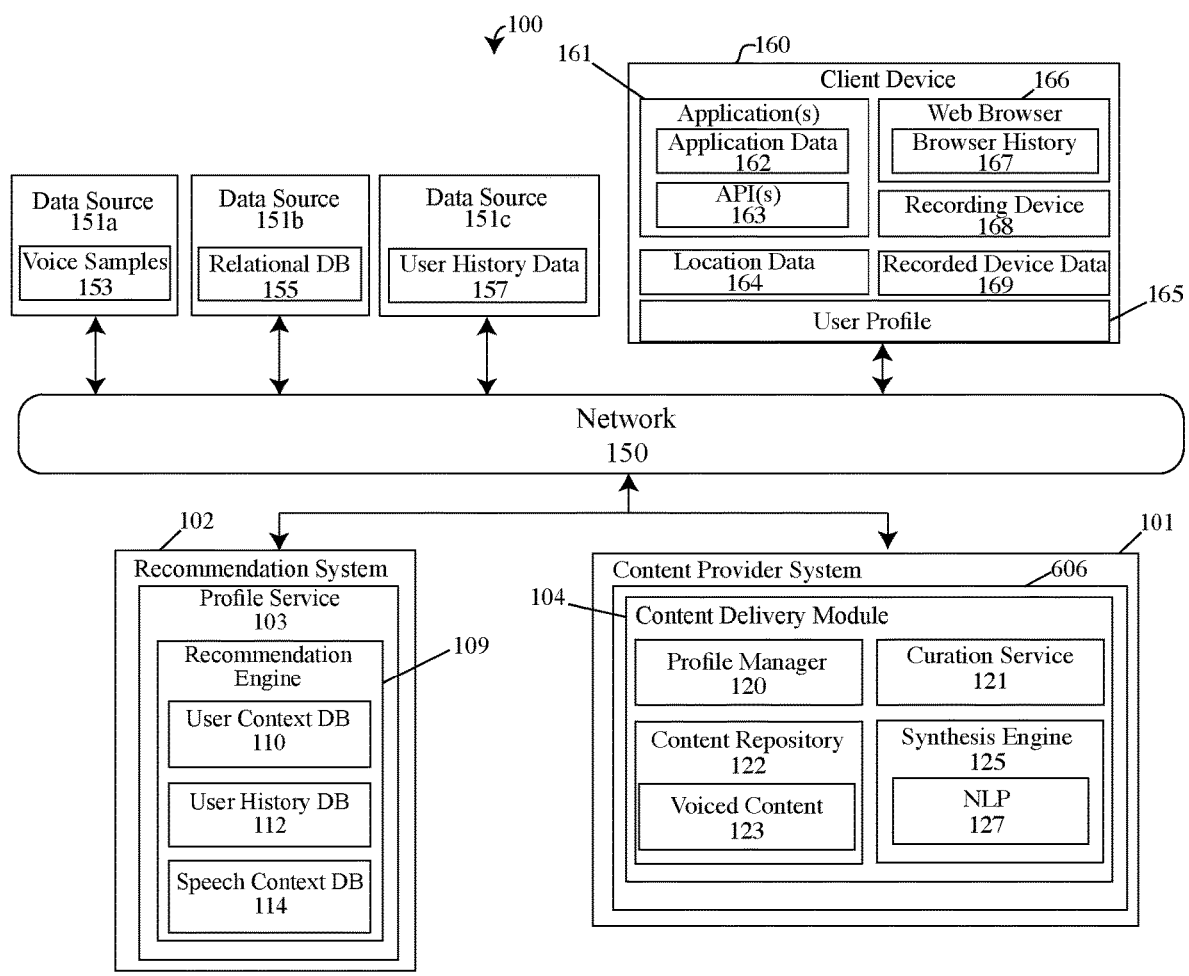
FIG. 1 depicts a functional block diagram illustrating an embodiment of a computing environment in accordance with the present disclosure.

In the modern age, voice-based applications and voiced content is becoming increasingly more pervasive in a person's daily life. Users may interact with or experience voiced content in many different scenarios. In some instances, voiced content can be found in the form of computer applications, advertising and streaming services such as podcasts, music and video. In other instances, computerized assistants, smart hubs, navigation, and chatbots may engage with the user and deliver messages, guidance or command prompts in the form of voiced content.

Human-like speech and interaction has become more common with the advent of advanced computerized assistants which may engage and converse with the user using a combination of voice commands, spoken audio and text.

Embodiments of the present disclosure recognize that current available systems for delivering voiced content lack the ability to dynamically alter and change the speech patterns or sounds of the voiced content being delivered to a user (outside of a handful of pre-recorded voice settings) based on the user's recent behaviors, experiences, interests and emotions. Unlike a traditional pre-recorded or user-selectable voice settings, embodiments of the present disclosure may dynamically customize the sound of the voice delivering the voiced content to the user. Advances in processing capabilities and machine learning algorithms, such as deep learning, advanced neural networks and artificial intelligence, may allow for speech synthesizers to mimic vocal patterns, sounds, pitches, tone, and emotions of human speech by analyzing voice samples of a target voice and selecting for desired properties of speech that would target the outputted speech of the synthesizer to resemble the target voice. Using advanced speech synthesis, realistic imitations of a target voice may be used to construct artificially generated human speech that may be presented as voiced content, without requiring a person to record the dialogue being delivered to the user.

Embodiments of the customized voices being synthesized and delivered by a content provider, may be personalized and vary from user to user. The voice selection and synthesis may occur dynamically, based on each users' habits, experiences, preferences and interests by tracking each user's behavior and logging the user's actions to each user's profile. Users may choose to opt-in or opt-out to being tracked, select the types of data the user agrees to have tracked and choose to receive notifications when data about the user is collected, tracked and stored to the user's profile. A user's profile may include data describing a user's personality, messages, browsing history, emotional state, location information, recorded video data and images, application use, application program interface (API) calls, previously played voices or audio, personalized preferences, experiences and other contextually relevant behaviors. The data stored by each user profile may be analyzed by a computer service responsible for evaluating the user profile. Embodiments of the present disclosure may draw conclusions based on the user's profile information and determine which voice(s) may be enjoyed or contextually relevant to the user and make voice suggestions to the content provider. Embodiments of the present disclosure, via the content provider, may modify existing voiced content using a synthesized voice that reads a transcript of the voiced content in a manner that mimics the voice suggested and deliver said modified voiced content to the user. For example, identifying a user's interest in the career of a specific professional actor or actress, then adjusting the voice of a computerized assistant to mimic the sound of the voice of the professional actor or actress when talking or communicating with the user.

Embodiments of the present disclosure may leverage the use of natural language processing technology, deep learning, neural networks, and artificial language synthesis to synthesize a modified version of the voiced content created and/or maintained by a content provider. Embodiments of the present disclosure may modify the voiced content by substituting the speech present in the original voiced content with artificially generated human speech that mimics a suggested voice that may be contextually applicable to a user (referred to herein also as a "contextually applicable voice"). In some embodiments, natural language processors may parse the original version of voiced content maintained by the content provider, break down the voiced content into smaller portions or phenomes, dissect the speech pattern, sounds, sentiment and identify key words that may be considered important or meaningful for understanding the voiced content. The voiced content may be transcribed from audio data into a text for further processing into a modified version wherein an originally included voice of the voice content may be replaced with an artificially generated voice that is synthesized to mimic a suggested voice that may be contextually applicable to the user.

A language synthesizing program may be applied to the transcript created by the natural language processor to generate the modified version of the voiced content having an artificially generated voice, which may imitate or sound like a human voice. For instance, by conditioning the language synthesis program to create a waveform imitating human speech based on a desired set of parameters of the suggested voice. Embodiments of the artificially constructed voice may be generated by analyzing one or more voice samples of the suggested voice speaking. Using the voice samples of the suggested voice being targeted for imitation as input into one or more neural networks, the speech patterns, tone, pitch and sounds of the voice targeted for imitation may be predicted and synthesized in such a manner that the artificially synthesized voice outputted as a waveform, may be indistinguishable from the actual human voice being imitated. Examples of language synthesizing programs that may be utilized to construct the artificially synthesized voice, may include WaveNet, SampleRNN or Adobe VoCo.

Accordingly, the synthesizing program may customize the original voiced content by replacing one or more speakers in the original voiced content with the artificially synthesized voice recommended to the synthesizing program based on the contextual applicability of the suggested voice to a user. The modified version of the voiced content comprising the artificially synthesized voice can be transmitted to a client device being operated by the user, whereby the modified version may be presented by an audio system associated with or integrated into the user's client device for playback to the user.

System for Customizing Voice Content

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Referring to the drawings, FIGS. 1-4 illustrate diagrams of a computing environment 100, 200, 300 capable of customizing voiced content 123 and delivering contextually applicable, artificially synthesized, modified versions thereof in accordance with the embodiments of the present disclosure. Embodiments of computing environment 100, 200, 300 may include a plurality of computer systems and devices interconnected via a computer network 150 as shown, including one or more content provider system 101, client device 160, recommendation system 102 and computer systems 600 maintaining data sources 151a, 151b, 151c (referred to herein generally as "data source 151") being accessed by the recommendation system 102 or content provider system 101.

Figure 6:
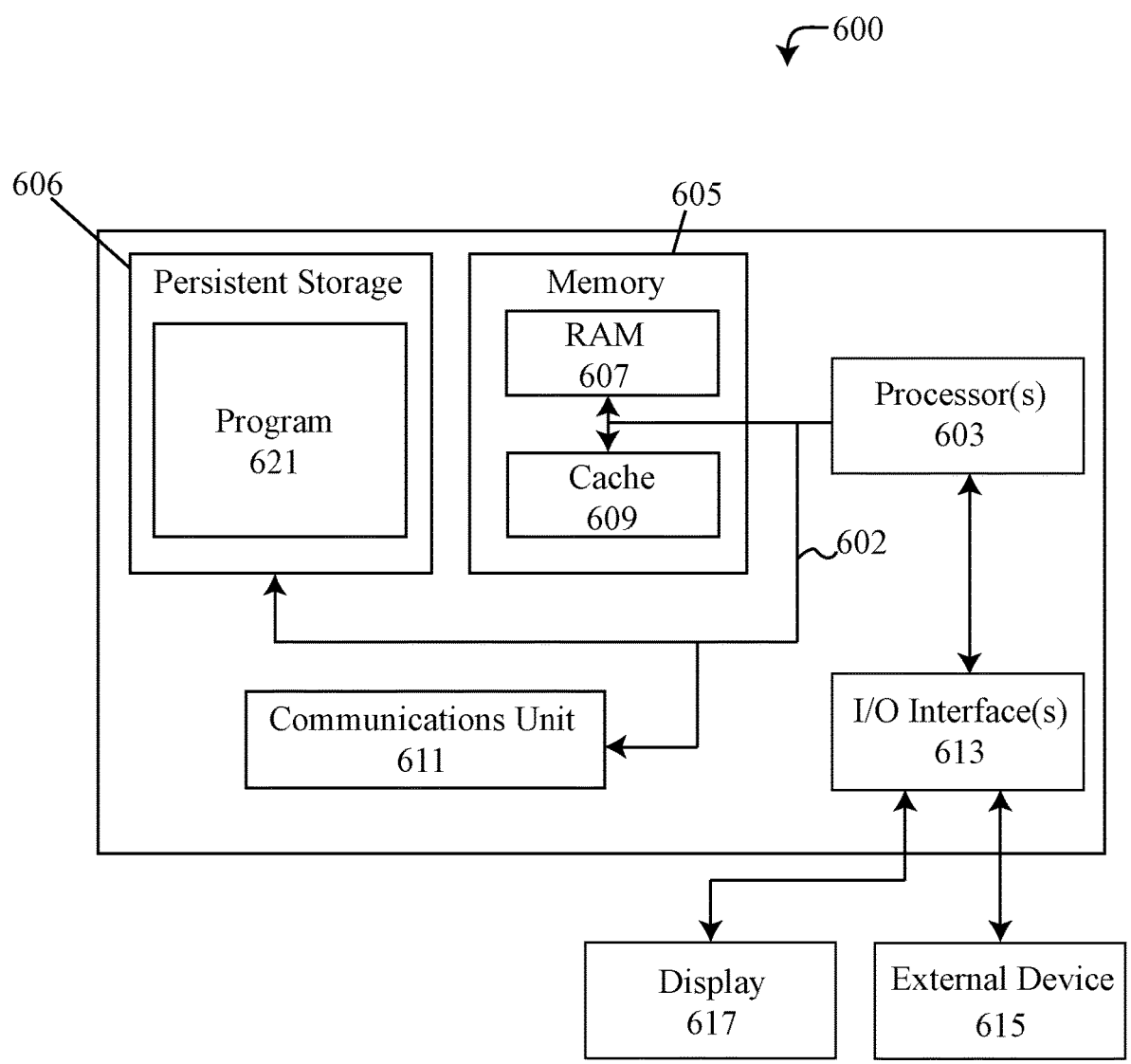
FIG. 6 depicts an embodiment of a block diagram of internal and external components of a computer system in accordance with the embodiments of the present disclosure.

Embodiments of the content provider system 101, client device 160, and recommendation system 102 may each be a specialized computer system comprising specialized configurations of hardware, software or a combination thereof, as shown and described in FIGS. 1-4 of the present disclosure and in the embodiments described herein. Embodiments of the content provider system 101, recommendation system 102, client device 160, and one or more data sources 151, may not only comprise the elements of the systems, components, and devices depicted in FIGS. 1-4 but may also incorporate one or more elements of a computer system 600, as shown in FIG. 6 and described in the COMPUTER SYSTEM section below. One or more elements of the computer system 600 may be integrated into the specialized computer systems of computing environment 100, 200, 300, including the integration of one or more processors 603, memory 605, persistent storage 606, communications unit 611, I/O interface 613, external device(s) 615 and/or a human readable display 617 into the content provider system 101, recommendation system 102, client device 160 and/or computer systems 600 maintaining the data sources 151.

Embodiments of the content provider system 101, recommendation system 102, client device 160, data sources 151 and other network accessible systems, may operate as desktop computers, laptop computers, tablet computers, smartphones, server computers, wearable accessories such as smart watches, smart glasses, or any other computer system known in the art or described herein. In some embodiments of the computing environments 100, 200, 300 the content provider system 101, recommendation system 102, client device 160, data source 151 and other network accessible systems, may represent computer systems utilizing clustered computers and components to act as a single pool of seamless resources when accessed through network 150. For example, such embodiments may be used in a data center, cloud computing, storage area network (SAN), and network attached storage (NAS) applications.

Embodiments of the content provider system 101, recommendation system 102, client device 160, data source 151 and other network accessible systems may each be connected and placed into communication with one another over a computer network 150. Embodiments of the computer network 150 may be constructed using wired, wireless or fiber optic connections. Embodiments of the content provider system 101, recommendation system 102, client device 160, data source 151 and other network accessible systems, may connect and communicate over the network 150 using a communications unit 611, such as a network interface controller or other network communication hardware. Embodiments of the communications unit 611 may implement specialized electronic circuitry allowing for communication using a specific physical layer and a data link layer standard. For example, Ethernet, Fiber channel, Wi-Fi or Token Ring.

Communications unit 611 may further allow for a full network protocol stack, enabling communication over network 150 to the group of computer systems or other computerized devices linked together through communication channels. Network 150 may facilitate communication and resource sharing among content provider system 101, recommendation system 102, client device 160, one or more data sources 151 and other network accessible systems connected to the network 150 (for example, network accessible storage media). Examples of network 150 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

Cloud computing networks are a model of service delivery for enabling convenient, on-demand network 150 access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network 150 and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment 300 is service oriented with a focus on statelessness, low coupling, modularity, and semantic interoperability. At the heart of cloud computing is an infrastructure that includes a network 150 of interconnected nodes 310.

Figure 3:
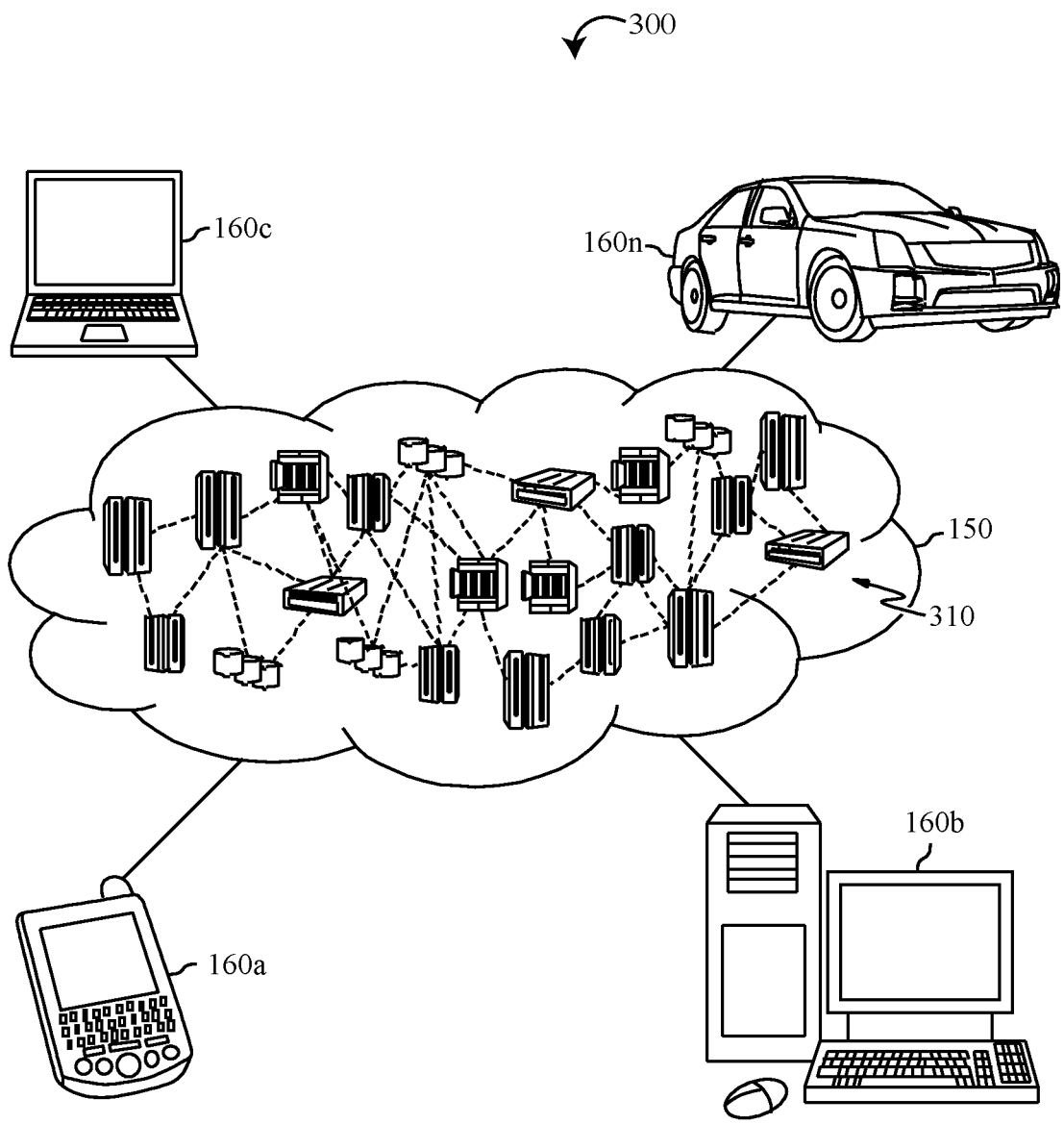
FIG. 3 depicts an embodiment of a cloud computing environment in accordance with the present disclosure.

Referring to the drawings, FIG. 3 is an illustrative example of a cloud computing environment 300. As shown, cloud computing environment 300 includes one or more cloud computing nodes 310 with which local client devices 160 used by cloud consumers, such as for example, a personal digital assistant (PDA) or cellular telephone 160a, desktop computer 160b, laptop computer 160c and/or automobile computer system 160n may communicate. Nodes 310 may communicate with one another and may be grouped (not shown) physically or virtually, in one or more networks 150, such as Private, Community, Public, or Hybrid clouds as described hereinabove, or a combination thereof. This allows the cloud computing environment 300 to offer infrastructure, platforms and/or software as services for which a cloud consumer does not need to maintain resources on a local client device 160. It is understood that the types of local client devices 160 connected to the cloud computing environment 300, are intended to be illustrative only and that computing nodes 310 and cloud computing environment 300 can communicate with any type of computerized device over any type of network 150 and/or network addressable connection (e.g., using a web browser).

Figure 4:
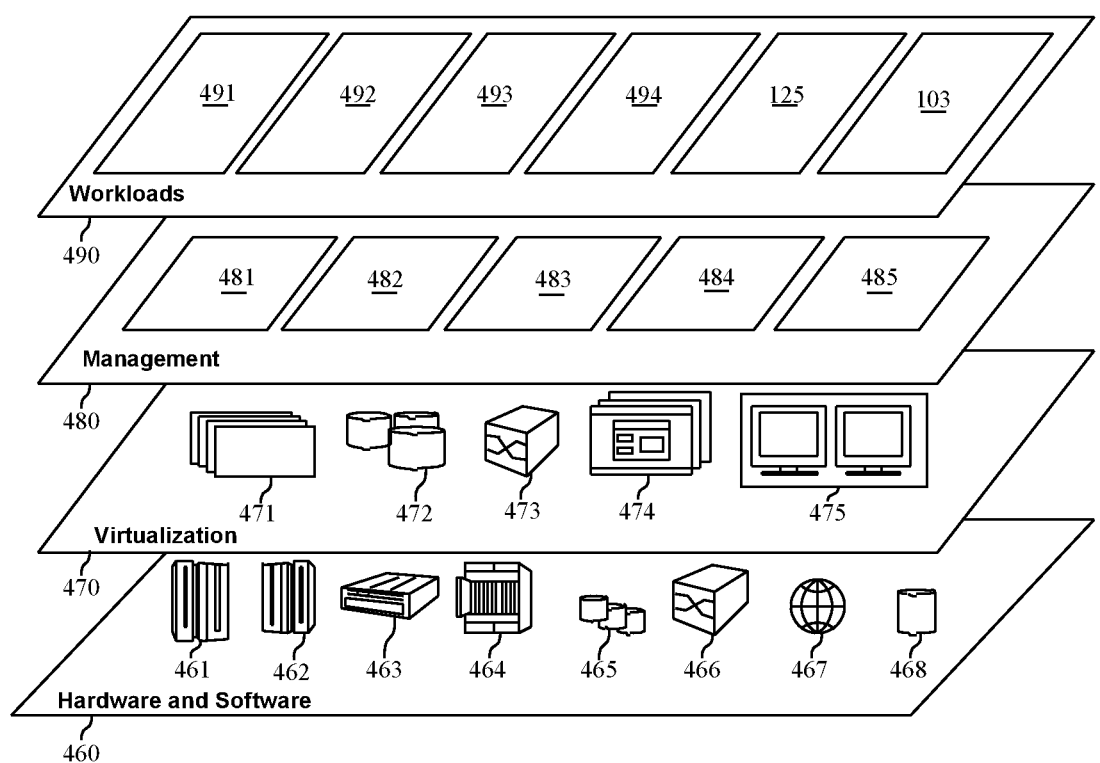
FIG. 4 depicts an embodiment of abstraction model layers of a cloud computing environment, in accordance with the present disclosure.

Referring now to FIG. 4, a set of functional abstraction layers provided by cloud computing environment 300 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include: mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include: mapping and navigation 491, software development and lifecycle management 492, data analytics processing 493, transaction processing 494, synthesis engine 125 and profile service 103.

Referring back to FIG. 1, embodiments of the computing environments 100, 200, 300 described herein may include a content provider system 101. The content provider system 101 may include one or more processes, services, engines and/or modules specializing in performing one or more specific tasks or functions associated with the customization and delivery of contextually relevant, artificially synthesized, voiced content 123 to client devices 160 operated by users seeking to view, access or receive content from the content provider system 101. For example, a content provider system 101 could be a web server, application server, mail server, real-time communication server, FTP server, open source server or virtual server, data center, content streaming service, social media web page, search engine, etc.

Embodiments of the content provider system 101 may be equipped with a content delivery module 104, which may include one or more components, services, programs, repositories, or engines as shown in the exemplary embodiment of FIG. 1. The term "module" may refer to a hardware module, software module, or a module may be a combination of hardware and software resources. A module (whether hardware, software or a combination thereof) may be designed to implement or execute one or more specific tasks, routines or functions. Embodiments of hardware-based modules may include self-contained components such as chipsets, specialized circuitry, one or more memory 605 devices and/or persistent storage 606 devices. A software-based module may be part of a program 621, program code or linked to program code containing specific programmed instructions loaded into a memory 605 device or persistent storage 606 device of a computer system 600 that may be operating as part of computing environment 100, 200, 300, as exemplified in the drawings or the embodiments described herein.

Embodiments of the content provider system 101, including any sub-systems, processes, services, engines and/or modules, whether hardware, software, or a combination thereof, may perform the functions and tasks associated with generating and delivering customized variations of the content maintained by the content provider system 101, including content comprising artificially-synthesized voiced content (referred to herein as "modified voice content"), delivered to a user, comprising an artificially synthesized voice that may be contextually relevant to the user. More specifically, embodiments of the content provider system 101 may include a content delivery module 104 which may perform one or more functions or tasks associated with maintaining user profiles and profile credentials, curating voiced content 123 owned or licensed by a content provider and managing storage of the voiced content 123 that may be modified and delivered to each user, using artificially synthesized.

Embodiments of the contextually applicable voice may be suggested by a recommendation system 102, wherein the suggestion by the recommendation system 102 or recommendation engine 109 may be referred to herein as a "recommended voice". The recommendations made by the recommendation system 102 may be based on each user's actions or experiences known to the computer systems of computing environment 100, 200, 300. The data collected about the user may be stored in the form of a user profile 165 ("user profile data"). The actions, experiences, activity and habits of the user may be analyzed to determine a contextually applicable voice that could be imitated and used to modify voiced content 123 being delivered to the user. Recommendations may be based on user's experiences, activities and habits that may occur within a pre-determined timeframe or a self-selected timeframe by the user. By limiting the timeframe, the context of the user's actions may be more recent and therefore more relevant to the user at the time of the delivery of the modified version of the voiced content 123. For example, selecting a voice heard by the user within the last few days rather than last year. Embodiments of the content delivery module 104 may include a plurality of components, sub-modules, engines, and other features that may be dedicated to performing one or more of the specific tasks of the content delivery module 104. For example, in some embodiments, the content delivery module 104 can include a profile manager 120, curation service 121, content repository 122, synthesis engine 125, and natural language processor (NLP) 127.

Referring to the drawings, FIG. 1 depicts an embodiment of a content provider system 101 that comprises a content delivery module 104. The embodiment of the content delivery module 104 may comprise a profile manager 120. The profile manager 120 may perform the function or task of managing, tracking and maintaining user profile data collected from users that may be used to describe the habits, preferences, experiences and interests of the user. The data collected about the user may be stored in the form of a user profile 165. Embodiments of the user profile 165 may provide a visual display of collected data that may be associated with a specific user or a customized computing environment. The user profile 165 may be a digital representation of a user's identity and may be formatted as a data structure that may capture one or more characteristics about the individual user, the user's experiences and habits while accessing the content provider system 101 and other computer systems 600 of the network 150. Each user profile 165 may be tied to a particular user and/or content provider and may store a description of the characteristics, preferences, behavioral data, browsing history, etc., which describe the user. In some embodiments, the profile manager 120 may control or restrict the accessibility or permissions of a user's client device 160 to obtain resources or access to the content stored by the content provider system 101. For example, profile manager 120 restricting the content of the content provider system 101 to registered users who have created user profiles 165 and are issued login credentials for securely accessing the content provider system 101.

Embodiments of user profiles 165 may act as a mechanism for sharing or transferring the collected data described by the user profile 165 to other systems, services, platforms or programs within the computing environment 100, 200, 300. Based on the conclusions drawn about the user and taking into account the user's previous experiences and habits, a recommended voice that may be contextually applicable to a user may be recommended and applied to the voiced content 123 being arranged for delivery to a user's client device 165. For example, a user has recently accessed content associated with a particular movie franchise. The user's viewing habits of movie franchise may be recorded in the user profile 165. At a subsequent point in time, the user may access a content provider system 101 via an application, which is responsible for delivering voiced content 123 using a computerized assistant. Based on the user's previously known interest in the movie franchise, a recommendation can be made to deliver the voiced content 123 via the computerized assistant using an artificially synthesized voice resembling a character from the movie franchise. When the user triggers the delivery of voiced content 123, the application may present a modified version of the voiced content 123 using the artificially synthesized voice from the movie franchise to recite the script of the voiced content 123.

Embodiments of the profile manager 120 may centralize the storage and management of the user profile data collected by each user profile 165, including user identity information, application 161 usage, browser history 167, search history, user behaviors, demographic information, location data 164, application 161 states, recorded device data 169, API 163 usage, social media data, behavioral data, comments, message data and other data describing the experiences or activities of a user known in the art. Embodiments of the profile manager 120 may consolidate and index each type of user profile data being collected from the client device 160 into an easily searchable set of user records that may describe each user and the user's interaction with the content provider system 101 and/or additional data sources 151. The user profile data collected, stored and maintained by the profile manager 120 may pass the user profile data collected and stored by user profile 165 between other platforms and services, including the profile service 103. Embodiments of profile service 103 may sort and store the collected user profile data into one or more databases. For example, as shown in the exemplary embodiment of FIG. 1, the profile service 103 store's user profile data in a user context database 110 (abbreviated user context DB 110), a user history database 112 (abbreviated user history DB 112) and a speech context database 114 (abbreviated speech context DB 114), each of which are described in more detail below.

Embodiments of the content delivery module 104 may further comprise a curation service 121. The curation service 121 may perform the function or task of managing content requests received by the content provider system 101. The content requests may be from users accessing the content provider system 101, searching the content repository 122 and requesting delivery of the content hosted by the content provider system 101 to the user's client device 160. A user accessing the content provider system 101 may interface with the curation service 121 to query the content repository 122 for content that may be of interest to the user. The term content repository 122 may refer to a centralized file storage location that may comprise resources that may be accessed and retrieved. The resources of the content repository 122 may include files, objects, and data that is created, owned, licensed, managed and/or maintained by the content provider or a third party affiliated with the content provider, such as a sponsor, advertiser, parent company, subsidiary or third-party content provider.

Embodiments of the curation service 121 may manage the search, retrieval, and delivery of the content stored by content repository 122 (including voiced content 123) that may be requested by the user. In some embodiments of the curation service 121 may curate the presentation of content hosted by the content provider system 101 to the user based on the preferences, viewing habits, and experiences of the user and data stored by the user profile 165. For example, a streaming website and social media web pages include recommendations and content feeds that a content provider system 101 can selectively present content determined to be of interest to the user when the user accesses the content provider system 101 by logging into via user profile 165. Embodiments of the curation service 121 can be tasked with selecting which content to display to each user (such as the content being featured most prominently to the user). Moreover, as a user interacts with the content presented by content provider system 101, the curation service 121 may retrieve and present additional content that may be available or stored by the content repository 122 and continuously updating the user profile 165 based on the content being requested, received and interacted with by the user. Thus, improving the predictability of the user's interests and increasing the ability for a recommendation system 102 and/or the profile service 103 to make more accurate voice recommendations to the content provider system 101 using the data collected and stored by the user profile 165.

Figure 2:
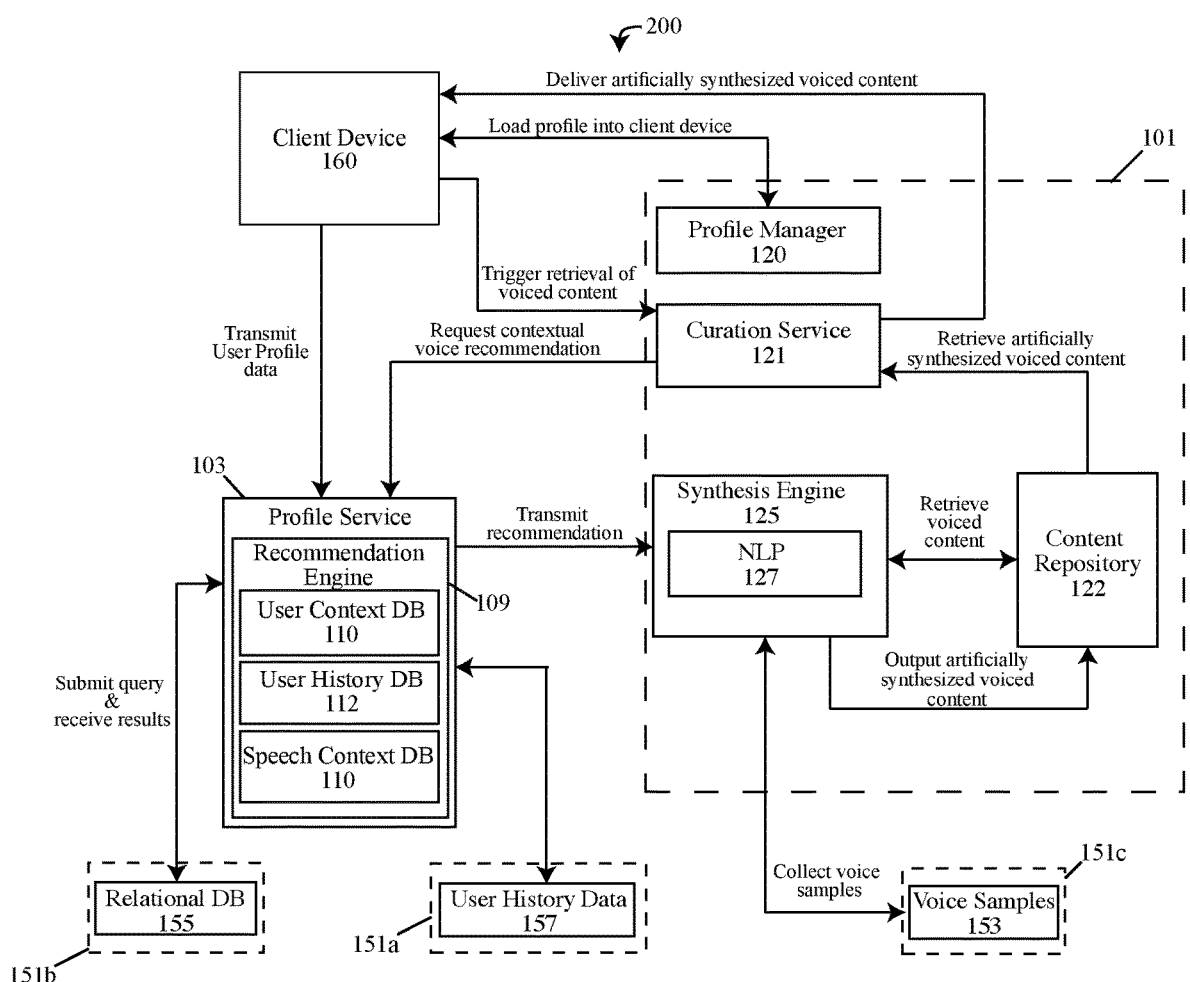
FIG. 2 depicts a block diagram describing a workflow of a computing environment executing a computerized method for customizing and delivering contextually relevant, artificially synthesized, voiced content in accordance with the present disclosure.

As shown in the workflow diagram of FIG. 2, users of the client device 160 may interact with the content provider system 101 via requests sent to the curation service 121. A user may transmit a direct request to deliver content to client device 160. In some embodiments, a user's interaction with the curation service 121, via one or more inputs into the client device 160, may trigger the curation service 121 to retrieve one or more sets of voiced content 123 as a result of the client device's 160 interaction with the content provider system 101. The triggering of the request for the curation service 121 to deliver voiced content 123 to the client device 160 can be a direct result of the user's content selection and interactions via the client device 160 in some embodiments. For instance, the user may be interacting with a voice-based application, a computerized assistant, and a GPS navigation program which may include turn-by-turn directions or a chatbot. Each of these examples may respond to inquiries and questions posed by the user using voiced content 123, which may comprise audio and/or a recitation of a response to the user in computerized human speech.

In other instances, the voiced content 123 may be triggered for delivery to the client device 160 based on secondary factors or behaviors of the user operating the client device 160, instead of a direct request for the content. Embodiments of voiced content 123 may be triggered based on the amount of time the client device 160 has accessed the content provider system 101, the type of content being accessed, or the amount of content being accessed from the content provider system 101. For example, voiced content 123 is an advertisement triggered for delivery to a user as a result of the user streaming a threshold amount of content from the content provider system 101 or streaming content from the content provider system 101 exceeding a pre-programmed amount of time before the advertisement is programmed to be delivered to the client device 160. In other instances, voiced content 123 may be associated with the content, for example, playing the voiced content 123 as an advertisement before displaying user requested streaming audio, video or other types of content.

Embodiments of the curation service 121 may initiate the customization and modification of voiced content 123 in response to a request or action performed by a user that triggers the delivery of voiced content 123 to a client device 160. Embodiments of the content provider system 101 may use a profile service 103 to recommend modifications to the voiced content, including suggestions for recommended voices to be applied to voiced content 123. The curation service 121 may communicate with a profile service 103 to receive recommendations describing potential customizations to the voiced content 123 that may be contextually relevant to the user. In some embodiments, the profile service 103 may be part of the content provider system 101 as a service within the content delivery module 104 being executed by a processor 603 of the content provider system 101. In the exemplary embodiment of FIG. 1, the profile service 103 may be a network accessible service which may be accessed by the content provider system 101 over network 150 via a recommendation system 102, which may maintain the profile service 103. One advantage of having the profile service 103 operating as a network accessible service, rather than locally stored service provided by the content provider system 101, is that a network accessible profile service 103 may interact with a plurality of computer systems 600 functioning as content provider systems 101 over network 150 rather than being dedicated to one content provider system 101. The profile service 103 may make contextually relevant voice recommendations to each content provider system 101 accessing the recommendation system 102 based on the user data collected via the user profiles 165 and/or stored by one or more databases accessible to the profile service 103.

Embodiments of the profile service 103 may be described as software functionality or a set of software functionalities that may perform the task of generating contextually relevant voice recommendations that may be used to modify one or more sets of voiced content 123, in order to customize the voiced content 123 for a specific user. The basis for the recommendations may be made using the user data stored by the user profile 165 of a particular user (the target user) scheduled to receive the voiced content 123 and/or one or more data sources 151 that may collect a user's historical data 157. Embodiments of the profile service 103 may automate the selection of the contextually applicable voices based on the past, present and future user context, known user preferences, likes, dislikes, habits, experiences, activity and historical data (such as browser history 167, application data 162, application(s) 161 used, API 163 calls, location data 164, and recording device data 169), as well as the context surrounding the information being delivered in the form of voiced content 123.

Embodiments of the profile service 103 may comprise a recommendation engine 109. Embodiments of the recommendation engine 109 may analyze the collected user data provided by each user profile 165, or more databases accessible to the recommendation engine 109 and/or secondary sets of data, provided by one or more data sources 151 (such as user's historical data 157 from other content providers and websites) to make voice recommendations to the content provider system 101. In some embodiments the data collected by the user profile 165 may be sorted and stored by the recommendation engine 109 onto one or more databases. Each of the databases may be queried and analyzed based on the recommendation engine's 109 rules, logic and/or inferences, in order to arrive at a conclusion that may suggest a recommended voice that may be used to modify the voiced content 123 in a manner that would be considered contextually relevant to the user.

Embodiments of the recommendation engine 109 may us a variety of technologies and techniques to enable the filtration of large amounts of user data in order to arrive at a smaller, focused, and contextually relevant voice recommendation. In some embodiments, the recommendation engine 109 may apply metadata tagging techniques to the user data stored or accessible to the recommendation engine 109. The recommendation engine 109 may also generate a recommendation using one or more data sources 151 which may be external to the recommendation engine 109. These data sources 151 may include meta-tagged or formatted information which may be compared to the metatags labeling the user data. For instance, the recommendation engine 109 may query a relational database 155 for information relating to one or more interests of a user. For example, the recommendation engine 109 may have access to user data of the user profile 165, wherein the user is known to enjoy a particular movie, television show, sports team, etc. The recommendation engine 109 can query the relational database 155 to further focus down the known user data information more granularly. For instance, by identifying a character from the particular movie or television show of interest to the user, or an athlete that plays for a particular sports team. In alternative embodiments, the recommendation engine 109 may receive semi-structured data from the user profile 165 which may have been provided by the user. For example, the semi-structured data could be user data that may have been directly inputted by the user into the content provider system 101, for example, when the user created a user profile with the content provider. Embodiments of the structured data provided by the user's direct input may include information such as the user's name, location, email address, social media handles, a list of interests, hobbies, occupation, etc.

FIG. 1 provides an example of the databases that may be used to index, maintain, organize and sort the user data received by the recommendation engine 109 from the user profile 165. In the exemplary embodiment of FIG. 1, the databases of the recommendation engine 109 may be referred to as a user context database 110, user history database 112 and a speech context database 114. Embodiments of the user context database 110 may organize, maintain and store data describing contextual associations between the user and various activities, habits, interests, social connections and/or or experiences. The user context database 110 may give insight into the user's location, events experienced, and/or activities the user may have participated in, in both virtual space and in the physical world. The context of the user's associations may be organized chronologically in some embodiments, wherein more current or recent contextual associations (i.e. within a predetermined or selected period of time) may be relied on or weighted more heavily by the recommendation engine 109. The data describing the context of the user's associations may be derived from various locations, including the state of one or more applications 161 that have been accessed via the user's client device 160, location data 164 such as GPS data, API 163 calls sent by the user's client device 160, application data 162 such as calendar entries, browser history 167, data which may be obtained from a web browser 166, social media data, email messages, direct messaging services and any other application data 162 that may be collected by the client device 160 or network accessible data sources 151.

In some embodiments, the contextual associations between the user and the physical world may be identified using audio or visual recognition techniques to analyze the environment surrounding a user. Audio or visual recognition of contextual associations may be based on recorded device data 169, including audio, image and video data, which may be recorded by one or more recording devices 168. Recording devices 168 may be integrated, connected or remotely accessible to the client device 160 or via a network accessible computer system 600. For example, recording device 168 may be a camera and microphone connect to the client device 160 or devices positioned in a public or private location. Embodiments of recording device 168 software may scan, analyze and compare the recorded device data 169 with known or archived data stored by a knowledge base, data sources 151 or other data repositories to identify people, objects, images, keywords, designs, brands or other information that may be recognizable in an image, video or audio recording. For example, by matching the visual details of the recorded images or video data to known objects, locations, people, trademarks, logos, etc. with or without consideration of additional data such as location data 164 and application data 162, additional details about the user or user's surroundings may be insightful for making contextually based voice recommendations. Moreover, recording device 168 software may parse recorded audio, search for keywords and tag each of the identified key words to the audio data.

Embodiments of recorded device data 169 may be analyzed to identify the surroundings of the user and further identify any information relating to a user's interests or preferences as evidence by the recorded audio, video or image data. A user or third party may record video, images and/or audio data using the recording device 168 of the client device 160, such as through the use of a camera system and/or microphone. The recorded device data 169, including the video, images and audio may be stored by the user profile 165 and transmitted to the recommendation engine 109 for further analysis in some embodiments. In alternative embodiments, the client device 160 may be equipped with analysis software for identifying the context of the recorded device data 169, tag images, audio and video, as well as catalogue the analyzed recorded device data 169 for storage and retrieval from one or more databases or repositories.

The recorded device data 169 and metadata associated with the recorded device data 169, may provide useful information to the recommendation engine 109. For instance, the recorded device data 169 can provide images or videos depicting the user's interests, hobbies, location, dates the user attended an event, social connections that may be associated with the user, which may be further tracked on social media websites, etc. For example, a user may attend a football game and use a recording device 168 to record video or pictures during the event that may be stored to the client device 160. The images or video may include not only the user, but also one or more individuals associated with the user during the event. From the images or video, computerized image recognition techniques may be applied (in conjunction with additional data or metadata) to identify the stadium as a football field, the teams participating in the game based on the uniforms or logos, as well as friends, family and social connections that may have attended the game alongside the user. Embodiments of the recommendation engine 109 may be able to further deduce and infer from the image or video a user's interest in football, and favorite team. Embodiments of the recommendation engine 109 may query a data source 151b comprising a relational database 155 in order to further narrow down athletes associated with professional football or athletes on one of the teams taking part in the game attended by the user. The recommendation engine 109 may make a voice recommendation that may be related to the user's experience at the football game. For example, recommendation engine 109 recommending the voice of a current or former player, coach, announcer, etc.

Embodiments of the profile service 103 may further include a user history database 112. Embodiments of the user history database 112 may receive, organize and store one or more types of user profile 165 data, which may be accessed and utilized as a source of data by the recommendation engine 109 to generate voice recommendation. Exemplary embodiments of the user history database 112 may operate as a historical bank of voices that may have been previously heard or experienced by the user. The user history database 112 may catalog each voice with one or more descriptive fields. Fields described by the user history database 112 may include the name of the person associated with the voice, the date(s) that each voice was heard, the source of the voice (i.e. the name of the movie, television show, album, in-person, etc.), the number of times a user has heard the voice, and one or more one or more keywords that may categorize or identify relevant information about the person associated with the voice.

Tracking the dates and frequency of each voice heard by the user may be beneficial for generating recommendations in multiple ways. For example, voices experienced more recently by the user can be considered more contextually relevant to the user when a recommendation is being sought by a content provider system 101. Accordingly, when analyzing data collected by the user profile 165 and/or stored by the databases of the profile service 103, embodiments of the recommendation engine 109 may limit voice recommendations being considered to one or more voices registered with the user history database 112 within a pre-determined or pre-programmed timeframe. For example, the recommendation engine 109 queries the user history database 112 for voices experienced by the user within the previous day, week, 2 weeks, month, 3 months, year, etc. Moreover, in various embodiments, the frequency with which a voice is cataloged by the user history database 112 may act as a strong indicator of an interest by the user of a particular person, topic or subject matter and thus more likely to be contextually relevant to the user.

In some embodiments of the recommendation engine 109 and the user history database 112 may further track within the historical bank of voices, whether or not the content provider associated with the content provider system 101 seeking the voice recommendation, has permission or a license to use the voice of the person being registered to the user history database 112. To avoid any legal issues that may arise regarding copyright, trademark, rights to publicity, the use of the name or likeness of the person or other intellectual property rights associated with the voice being recommended, the recommendation engine 109 may limit the recommendations being considered to the voices of people or characters that the content provider has rights to use. For example, a content provider may have an active list of celebrities, endorsees, spokespeople or other individuals that are employed or have contracted with the content provider, which have already licensed or assigned the rights to use the person's name and likeness, including voice. For example, the content provider seeking a recommendation from the recommendation engine 109 could be a large media company that may already have a large pool of intellectual property and characters already owned by the company. Accordingly, in this particular embodiment, since the media company already has the rights secured to use the voices of owned characters and intellectual property, the historical bank of voices to draw a voice recommendation from can be a pool of owned or licensed characters.

In another example, the content provider could be a sporting equipment company that may have dozens or even hundreds of endorsees that are paid or under contract with the sporting equipment company. The recommendation engine 109 may be able to track which voices within the user history database 112 are permissible to use and select a voice of one of the endorsees for the sporting equipment company that is both contextually relevant to a user and acceptable to modify the voiced content 123. For instance, a user may be known to be an avid golfer or fan of the sport, based on the user profile 165. In this particular example, the recommendation engine 109 uses the user's interest in golfing to query the historical data bank of voices in the user history database 112 to identify a permissible voice (i.e. an endorsee of the sporting equipment company) of a past or present golfer to recommend, that the user has previously heard or experienced before.

In some instances, where a voice listed in a record of the user history database 112 would not be considered an acceptable voice recommendation (an "impermissible voice"), for example due to licensing restrictions or lack of permission, the recommendation engine 109 may identify an alternative voice recommendation that the content provider would have permission to use (an "acceptable voice"). The acceptable voice identified may have a direct or indirect relationship to the impermissible voice. For example, using the sporting equipment company example above, if the first voice recommendation considered by the recommendation engine 109 is an athlete whose voice has been previously experienced by the user but would be considered an impermissible voice (perhaps due to not being under contract or an endorsee of the company), the recommendation engine 109 can further identify an acceptable alternative athlete whose voice would be permissible to use in a modification of the voiced content 123. For example, the acceptable alternative could be a current or former teammate or a past athlete that may have played for the same team or franchise as the person identified in the first voice recommendation that would have been an impermissible voice to use.

Embodiments of the recommendation engine 109 may be able to identify a relationship between voices that are permissible and impermissible, using one or more relational databases 155. The profile service 103 may query a relational database 155 comprising information about the person whose voice is impermissible to use in order to find a person who may be relationally tied thereto, but that the content provider would have permission to use. For example, the impermissible person identified by the recommendation engine 109 could be an actor or actress. A permissible voice could be identified as a voice of a person who might be derived from the same source material as the voice experienced by the user (but impermissible for the content provider to use). For example, recommending a voice of a person who played a character from the same movie or film as the person whose voice would be impermissible to use.

Embodiments of the profile service 103 may query a relational database 155 for a person whose voice may be impermissible to use in order to identify other persons who have some relationship to the impermissible person, that are able to be properly recommended to the content provider system 101. For example, using the example above describing the impermissible person identified by the recommendation engine 109 based on the user profile 165 as an actor or actress, the recommendation engine 109 finds a substitute person that is permissible by querying a relational database 155 that is dedicated to tracking the works of movies and television, such as an internet movie database (IMDB) available via website and/or computer applications. In various embodiments, based on the query of the impermissible person using the IMDB, lists of movies, television shows, fellow actors or actresses, directors, etc. that have worked with the impermissible person may be returned from the query. In various embodiments, the query results may be analyzed by the recommendation engine 109 for a tangentially related and permissible person that could be recommended. For example, replacing the impermissible person with a permissible actor or actress that has appeared in the same movie as the impermissible actor or actress, and present the permissible person as the contextually relevant voice suggested for modifying the voiced content 123.

Embodiments of the historical bank of voices stored by the user history database 112 may be compiled from a plurality of sources that may be accessible and experienced by each user. For example, in some instances, the sources of voices experienced by the user can be from a recording device 168 which may be associated with the client device 160 or publicly placed recording devices 168. The recording device 168 may have permission to listen and track sounds (including voices), being output by the client device 160, devices external to the client device 160 such as television speakers, movie theatres, automobile stereos, public microphones, and computerized assistants. Embodiments of the user history database 112 may further build the historical bank of voices experienced by the user from application data 162, browser history 167, the users: social media, call history, emails, messaging services, calendar entries, streaming services and other types of data that may accessed and collected by the client device 160. For example, a user accessing a music streaming or video streaming application from the client device 160 and select a particular video or artist to watch or listen to. Viewing patterns or listening habits may be tracked and recorded to the user profile 165, user context database 110, user history database 112 or a combination thereof.

In some embodiments of the profile service 103, the profile service 103 may include a speech context database 114 to assist with selecting a contextually relevant voice to apply to the voiced content 123 based (at least in part) on the situation of the user at or around the time the request for a voice recommendation is made by the content provider system 101. For example, the context wherein the modified voiced content is presented during an emotional moment for the user, when the user is upset, aggravated, sad etc. Embodiments of the speech context database 114 may use the data collected by the user profile 165 to infer and track the physical state, sentiment and emotions of the user. For example, by tracking the sentiment of messages sent via a messaging service, email, social media posts to gauge the user's current state or emotions. In response, the recommendation engine 109 may adjust a voice recommendation to take into account the emotional context or physical state of the user when generating a voice, recommendation. For example, selecting a calming or soothing voice if the user is determined to be frustrated or upset.

In other instances, the physical state, sentiment or emotions of the user being tracked by the speech context database 114 could be based on the types of applications 161 that may be currently active on the client device 160 at the time the request for a voice recommendation is made. Certain types of computer applications and application data 162 may have a higher probability of eliciting a particular emotion from a user. For example, a mapping application known to be currently active on the client device 160. The use of a mapping application may indicate that a user may not be familiar with the surroundings, traveling to a new location, lost, etc., which may be known to be stressful to users generally or there may be consistent emotional response exhibited by a particular user while using the mapping application. Application data 162 of the mapping application may further indicate delays in travel time, which can be known to be frustrating to a user. Other devices recording information about the user may be consulted or analyzed to confirm the user's current sentiments or emotions. For example, a wearable device, monitoring the user's vitals, including heartbeat or pulse may further confirm the user's anxiety or frustration by the presence of a rapid heartbeat or a racing pulse, the sentiment of a user's messages being sent via a messaging service, or speech recorded by a recording device 168.

From the information about the type of computer applications 161 being used and the application data 162, the speech context database 114 may record information to one or more records of the speech context database 114, which may describe the user and the user's predicted emotion and/or sentiment. In the case of the mapping application described above and the existence of the heavy traffic, the recommendation engine 109 may infer that the user is upset or frustrated. Accordingly, the contextually relevant voice recommended to use by the mapping application (who's server may be operating as the content provider system 101) may be more heavily weighted toward recommending a voice that is calming or soothing voice to provide the turn by turn directions, other voiced content 123 that may be provided by the mapping application in this example, or other applications that may be simultaneously active.

Based on the voice recommendations provided by the profile service 103, embodiments of the content provider system 101 may modify the voiced content 123 or generate new voice content by artificially synthesizing speech that audibly sounds as if the dialogue of the voiced content 123 is being spoken by the voice recommended via the profile service 103. The content provider system 101 may artificially synthesize the recommended voice using a synthesis engine 125 which can artificially produce human speech.

Embodiments of the synthesis engine 125 may synthesize artificial human speech using speech to text, text to speech, neural networks and combinations of technologies thereof. The speech to text functions of the synthesis engine 125 may be performed using a natural language processor 127. The natural language processor 127 may be implemented to understand the original voiced content 123 stored by the content repository 122 and convert the voiced content 123 into raw text and further process the raw text into smaller phonemes. For example, the natural language processor converts the voiced content 123 into a transcript of the dialogue spoken by the voiced content 123. Embodiments of the natural language processor 127 may convert speech of the voiced content 123 into text using Hidden Markov Models (HMMs). HMMs are statistical models that turn speech into text using mathematical calculations to determine what is being said. HMM's may convert the speech of the voiced content 123 into text by breaking down the speech into small units which may be approximately 10-20 milliseconds. The small units of speech may be compared to pre-recorded speech to determine the phoneme of each unit. Based on the series of phonemes, the natural language processor 127 can statistically determine the most likely words and sentences being spoken and output the information in the form of text.

The natural language processor 127 may, in some embodiments, further understand the outputted text of the speech using one or more techniques. Embodiments of the natural language processor 127 may understand each type of word of the text using part-of-speech tagging (POS). The natural language processor 127 may identify the characteristics of each word, for example, whether each word is a noun, verb, adjective, etc. and the tense of the word. The natural language processor 127 may include a lexicon and a set of grammar rules encoded into the system of the natural language processor 127. Using one or more natural language algorithms and statistical machine learning to apply the rules of natural language, the meaning of the words in the text may be understood by the synthesis engine 125.

Embodiments of the synthesis engine 125 may generate artificial human speech that mimics the voice recommended by the profile service 103 using text-to-speech techniques and/or advanced neural networks to create new speech-like waveforms that read the text outputted by the natural language processor 127, creating modified voiced content that comprises artificially synthesized human speech that can be delivered to a user's client device 160. Embodiments of the synthesis engine 125 may use one or more techniques to create the artificial human speech.

In some embodiments, the synthesis engine 125 may use concatenative text-to-speech techniques. Concatenative text-to-speech may generate artificial human speech using a library of speech fragments recorded by a speaker. These speech fragments can be used to produce complete words and/or sounds by combining together the fragments to form the desired sentences and speech. For example, by creating a large library of words, sentences and sounds from voice samples 153 recorded by the person whose voice was recommended by the profile service 103. Using the text outputted by the natural language processor 127, the synthesis engine 125 may take sound fragments from recordings of the voice samples 153 and recombining the fragments into the desired order that matches the text of the voice content 123 outputted by the natural language processor 127.

In other embodiments, the synthesis engine 125 may generate artificial human speech using parametric text-to-speech techniques. Parametric techniques may include the use of mathematical models to recreate sounds within a set of selected parameters in order to obtain the vocal qualities desired in the audio waveform outputted from the synthesis engine 125. Parametric techniques generate sound by combining parameters of similar fundamental frequency, magnitude, etc. and processing them to generate speech. For example, one or more voice samples 153 are retrieved and stored by the content provider system 101 of the recommended voice being mimicked by the synthesis engine 125. The voice samples 153 may include recorded audio that is accessible to the content provider system 101 via network 150 and may be analyzed by the synthesis engine 125 for desired properties and parameters. The recreated sounds having the desired properties imitating the voice samples 153 may be assembled into words and sentences. The information that may be collected to generate the sounds may be stored in one or more parameters of the mathematical models.

Parametric techniques may synthesize speech in two stages. First, linguistic features such as phonemes, duration, etc. can be extracted from the voice samples 153. Second, characteristics of the artificial human speech outputted by the synthesis engine 125 can be created using a voice synthesizer and/or a signal processing algorithm such as a vocoder. Using parametric techniques, the speech outputted by the synthesis engine 125 can be controlled by the voice samples 153 input into the mathematical models in order to achieve an output voice that mimics the voice recommended by the profile service 103. Vocoder parameters and features can be extracted from the voice samples 153. The vocoder may take the desired features and parameters from the voice samples 153 and perform complex transforms to generate an audio waveform that estimates the desired parameters of speech, including the phase, rhythm, stress, intonation, etc.

A synthesis engine 125 employing concatenative or parametric text-to-speech techniques may be composed of two parts, a front-end and a back-end. The front-end of the synthesis engine 125 may perform the function or task of converting text containing symbols such as numbers or abbreviations into the equivalent written words, a process which may be referred to as normalization, pre-processing or tokenization. Moreover, the front-end of the synthesis engine 125 may assign phonetic transcriptions to each word, as well as divide and mark the text into prosodic units, for example phrases, clauses and sentences. The process for assigning the phonetic transcriptions to words may be referred to as text-to-phoneme or grapheme-to-phoneme conversion. Phonetic transcriptions and prosody information together may make up the symbolic linguistic representation outputted by the front end of the synthesis engine 125. The back-end of the synthesis engine 125 may perform the synthesizer functions, converting the symbolic linguistic representations of the front-end into sound. Embodiments of the back-end may include a computation of the target prosody (pitch contour, phoneme duration, etc.) which may be imposed on the output from the synthesizer in order to match the artificial speech being outputted from the synthesizer to the recommended voice that the synthesis engine 125 is attempting to mimic.

In some embodiments, the synthesis engine 125 may purposefully distort or insert a desired level of variation in the voice being mimicked, in order to avoid a fully accurate recreation of the recommended voice. Purposeful distortion when synthesizing or selecting features of the synthesized voice may be desirable in situations wherein a content provider may not have licensed or received permission to use the recommended voice. The synthesis engine 125 may alter, distort or change the recommended voice enough so as to not to infringe upon a third party's rights, while still creating artificial human speech that evokes a familiarity of the recommended voice when user hears the modified voiced content comprising the recommended voice. For example, the voice synthesizer of the synthesis engine 125 injects a certain level of noise into either the input (i.e. the voice samples 153) being used to generate the artificial speech, or the output (i.e. the artificial speech itself). In some embodiments, during the training phase, algorithms and models used to generate the artificial speech, may be trained onto the recommended voice and the classifier may purposefully direct the algorithm to select for sounds that vary enough away far enough from the voice samples 153 of the recommended voice when creating the artificial speech, so as to prevent the synthesizer from creating artificial speech that would be considered indistinguishable from the recommended voice.

In the exemplary embodiment of the synthesis engine 125, advanced speech synthesis techniques may be employed using deep learning and artificial intelligence modeling. For example, using deep neural networks and convolutional neural networks (CNN) to mimic the speech of the voice recommended by the profile service 103. Advanced techniques may directly model waveforms by digitizing the audio waveform using a neural network trained with recordings of real speech (i.e. voice samples) of the recommended voice to produce raw waveforms of artificial human speech. The waveforms can be selectively conditioned to achieve a desired set of properties and sound of the recommended voice to create a waveform reciting the transcript of text outputted by the natural language processor 127 in the voice recommended by the profile service 103.

Embodiments of the advanced speech synthesis techniques may use a generative model operating directly on a raw audio waveform to directly model the waveform of an audio signal, one sample at a time. A typical audio sampling rate can vary widely, but common sample rates include, but are not limited to, 44.1 khz (44,100 samples per second), 48 khz (48,000 samples per second), 32 khz, 16 khz, and 8 khz. When training the model, input sequences comprising real waveforms of human speakers are provided (for example voice samples 153 of the target voice). At each step during sampling, a value may be drawn from the probability distribution computed by the neural network. The joint probability of a waveform $x=\{x_1, \ldots, x_{t-1}\}$ is factorized as a product of conditional probabilities, wherein said probabilities may be calculated as follows:

$$p(x) = \Pi_{t=1}^{t} p(x_1 | x_1, \ldots, x_{t-1})$$

Each audio sample $x_t$ generated, may be conditioned on the samples from all previous samples generated. The audio sample may then be used with previous samples to generate the next sample. This technique may be referred to as autoregressive generation. A conditional probability distribution can be modeled by using stacks of convolutional layers. A digitized, raw audio waveform may be used as an input, which flows through the convolutional layers until a waveform is outputted.

In some embodiments of models using an autoregressive generation model, the model may be considered to be "not conditioned." The term "not conditioned" may mean that the autoregressive generation model is not provided any information about the structure of the speech. However, by conditioning the model using additional input variables, the waveform being outputted can be guided toward a particular result (a desired sound that mimics the recommended voice), resulting in audio output having a set of desired characteristics. By providing vocoder parameters such as those described above for text-to-speech systems, along with the raw audio input of the voice samples 153, and the linguistic and/or phonetic features of the text outputted from the natural language processor 127 (as described by the processing of the text above by the front end of the synthesis engine 125), a high-quality voice replicating the recommended voice of the voice samples 153 may be produced which reads the transcript of the text inputted into the autoregressive generation model.

In some embodiments of conditioned autoregressive generation models that use CNN's, conditional distributions can be modeled using a mixture of models, including a mixture density network, conditional Gaussian scale mixtures or softmax distributions. Since raw audio may be typically stored in 16-bit integer values (one per timestep), a softmax distribution may need to output 65,536 probabilities per timestep in order to model all possible values. To simplify the model, a µ-law companding transformation can be applied to the data and then quantize the transformation for 256 possible values using the equation:

$$f(x_t) = \sin(x_t) \frac{\ln(1 + \mu |x_t|)}{\ln(1 + \mu)}$$

wherein, $-1 < x_t < 1$ and $\mu = 255$.

In alternative embodiments of the autoregressive generative model, instead of using stacks of convolutional layers, artificial human speech can be generated using a hierarchy of recurrent layers in a recurrent neural network (RNN). The recurrent layers of the RNN may have different clock-rates to process the audio being generated. The top tier of the hierarchy may take large chunks of input data, process the data and pass it on to the lower tiers of the hierarchy. Each lower tier receiving the smaller chunks of input data will continue processing the smaller set of data from the previous tier and pass the output from the current tier onto the next tier of the hierarchy. The processing of the audio continues until the bottom most level of the hierarchy is reached, wherein a single audio sample is generated. Similar to the autoregressive generative model that uses a CNN, the RNN embodiments may similarly use vocoder parameters of text-to-speech systems to train the RNN to output a desired waveform that has parameters which achieve a desired sound mimicking the voice recommended by the profile service 103.

Method for Customizing Voice Content

Figure 5A:
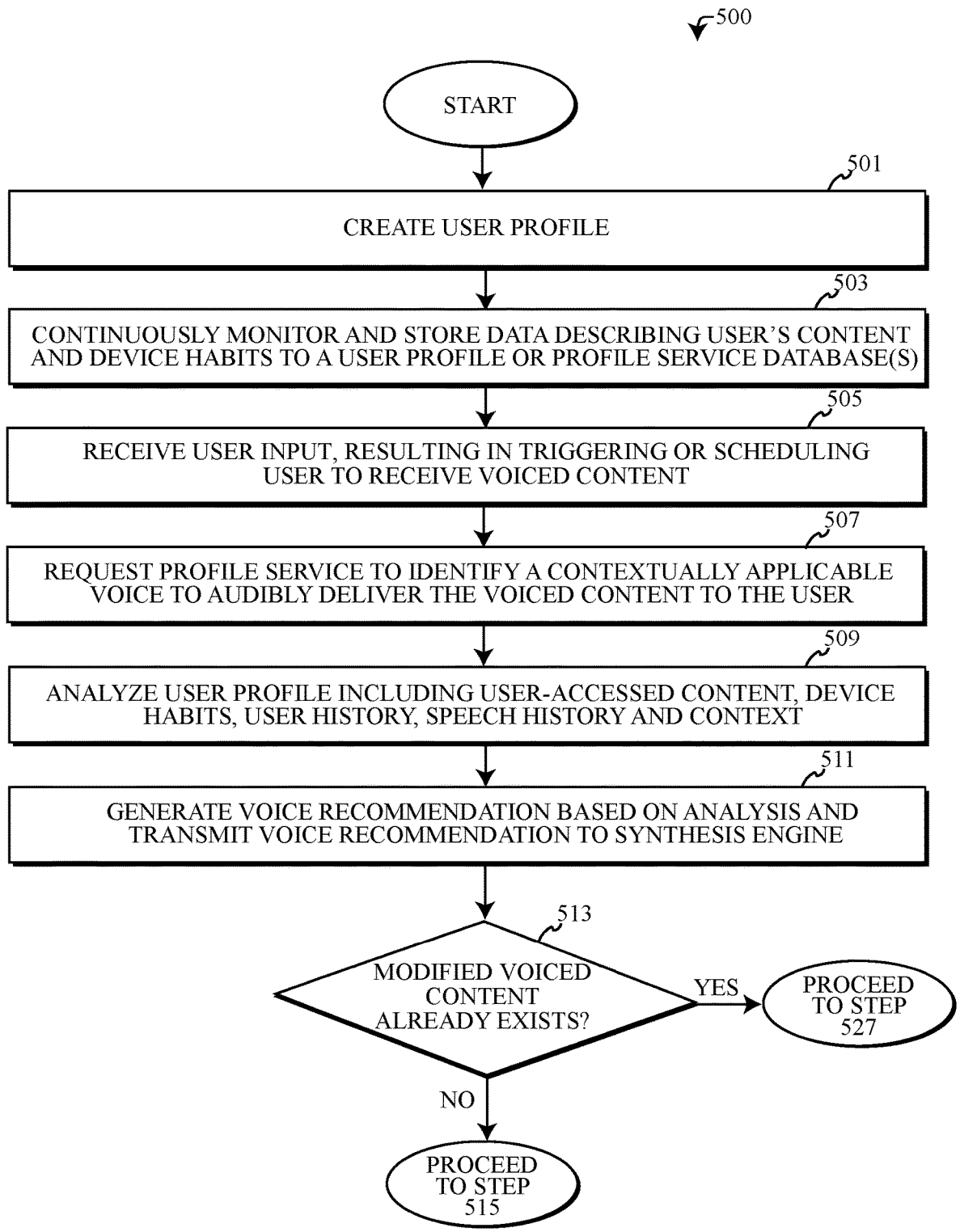
FIG. 5a depicts flow diagram describing an embodiment of an algorithm performing a computer implemented method for customizing and delivering contextually relevant, artificially synthesized, voiced content in accordance with the present disclosure.
Figure 5B:
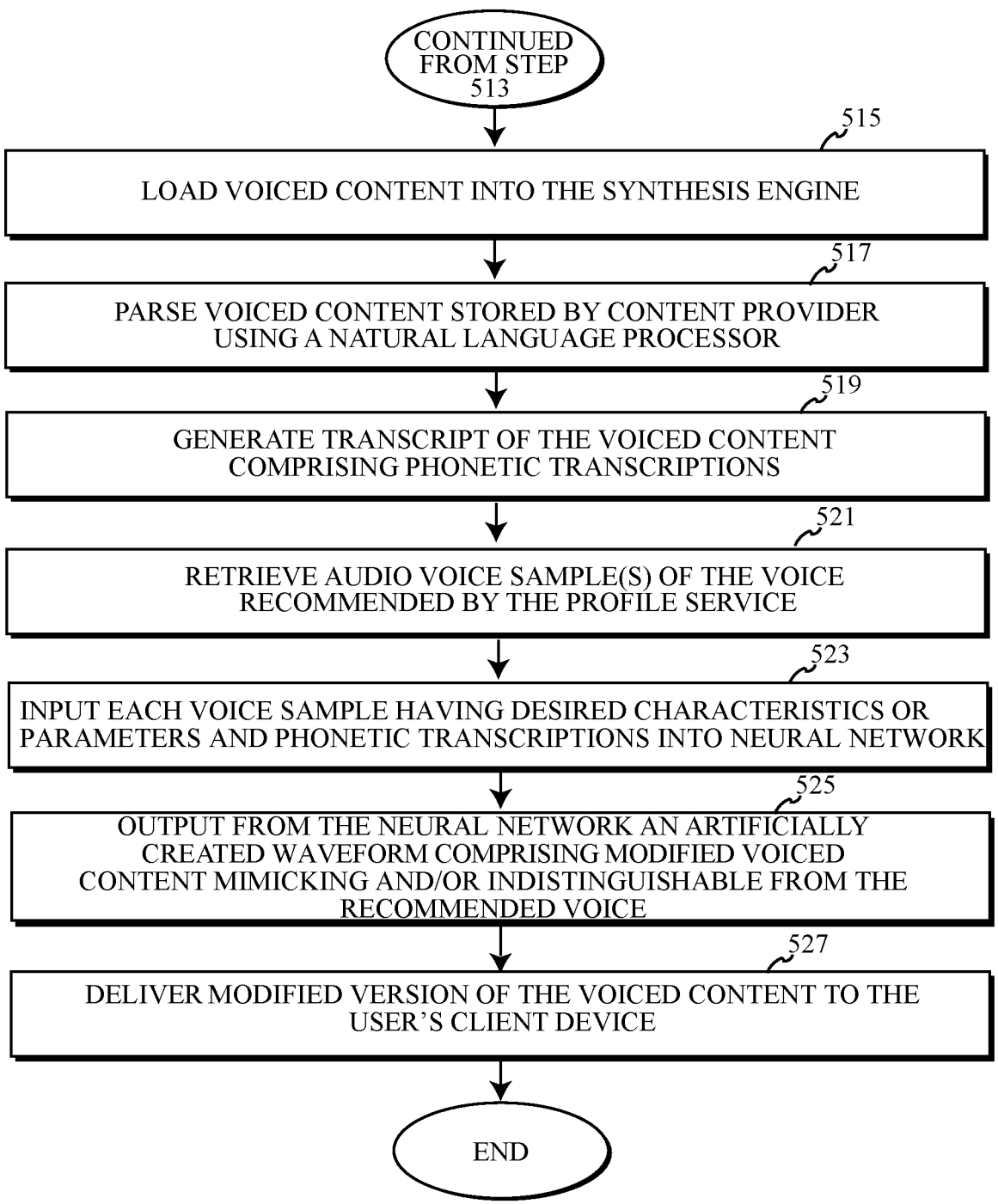
FIG. 5b is a continuation of the flow diagram of FIG. 5a, describing the embodiment of the algorithm performing the computer implemented method in accordance with the present disclosure.

The drawings of FIGS. 5a-5b represent embodiments of an algorithm 500 for implementing computerized-methods for synthesizing and delivering contextually relevant, artificially generated, voiced content as described in accordance with FIGS. 1-4 above using one or more computer systems as defined generically by computer system 600 of FIG. 6 below and more specifically by the embodiments of specialized computer systems, components, programs and services depicted in FIGS. 1-4 and as described herein, including the content provider system 101, recommendation system 102, profile service 103, and client device 160. A person skilled in the art should recognize that the steps of the method described in FIGS. 5a-5b may be performed in a different order than presented and the methods of FIGS. 5a-5b may not require all the steps described herein to be performed.

Rather, some embodiments may alter the methods by using one or more of the steps discussed below.

FIG. 5a represents a flowchart illustrating a first portion of an algorithm 500 for implementing a computerized method for synthesizing and delivering contextually relevant, artificially synthesized voiced content in accordance with the embodiments of the present disclosure. The embodiment of the method 500 may begin at step 501. In step 501, a profile manager 120 may create a user profile 165. The user profile 165 may be a content provider specific user profile 165 which may be used to access the content from the content provider system 101, such as server hosting a website or application. In other embodiments, the user profile 165 may be a general user profile 165 that can be used to access or track a user's habits, experiences and activity across multiple applications, websites and/or platforms. An example of a general user profile 165 can be a user profile 165 tied to an email address, web browser or social media platform.

In step 503 of method 500, the user's activity, interests, habits, experiences, etc. may be continuously monitored and data describing the user may be collected and stored by the user profile 165. The data stored by the user profile 165 may describe a user's content or client device 160 habits and may include data or metadata describing one or more application(s) 161, application data 162, API(s) 163 or API call(s) being transmitted, location data 164, browser history 167 and/or recorded device data 169. Embodiments of the data and/or metadata may be stored locally to the user profile 165 residing on a user's client device 160, on a computer system 600 remotely accessible via network 150, on the content provider system 101 and/or by a recommendation system 102. In some embodiments, the data or metadata being stored by the user profile 165 may be analyzed, sorted and stored in one or more records of one or more databases accessible by a profile service 103. Examples of databases wherein the user profile 165 data or metadata may be stored may include a user context database 110, a user history database 112 and/or a speech context database 114 described above.

Embodiments of the method 500 may proceed to step 505, wherein input from a user accessing a content provider system 101 may schedule or trigger the user to receive voiced content 123. A user's input while accessing the content provider system 101 may include sending back and forth one or more requests to access the content of the content provider system 101 by interfacing with the curation service 121. The curation service 121 may, in response to the requests by the user, query, retrieve and deliver the requested content stored by the content repository 122 to the client device 160. As a function of the requests and content being sent back and forth between the user of the client device 160 and the curation service 121, the actions of the user may result in prompting the delivery of voiced content 123. Scheduling to receive voiced content 123 of the content provider system 101 may be as a result of the user's input accessing the content provider system 101 which may trigger the delivery of voiced content 123 based on the actions of the user, for example as a result of the content requested to be accessed, the amount of content requested, the amount of time spent accessing the content provider system 101, pre-determined delivery of voiced content 123 or selecting content that triggers voiced content 123 to be delivered as a result of the selection.

Voiced content 123 that may be scheduled for delivery to the user may be customized for the particular user and modified to include a contextually relevant voice tailored to the preferences, interests and experiences of the particular user scheduled to receive the voiced content 123. The contextually relevant voice that may be applied to the voiced content 123 may be suggested using a profile service 103 connected to one or more content provider systems 101 and tasked with generating voice recommendations that may be personalized for a particular user. In step 507, the content provider system 101 may transmit a request to the profile service 103 requesting the profile service 103 to identify a contextually applicable voice recommendation that the content provider system 101 may use for modeling synthetic human speech and applying the resulting synthetic speech to the voiced content, forming modified voiced content that can be delivered to the user's client device 160.

In step 509 of the embodiment of method 500, the recommendation engine 109 of the profile service 103 may analyze a user profile 165 that is tied to the user scheduled to receive voiced content 123 from the content provider system 101. Embodiments of the recommendation engine 109 may analyze the data and/or metadata collected by the user profile 165, including previously accessed content received by the user, client device 160 habits, and other information and/or data that has been stored by the user context database 110, user history database 112 and speech context database 114. As part of the analysis step, the recommendation engine 109 may not only consider past user habits, interests and experiences such as those stored by the user context database 110, but also the voices that may be more recently heard by the user and stored in the historical bank of voices maintained by the user history database 112, the permissibly available voices that the content provider may have the rights to use and/or imitate and the emotional state or sentiment of the user at the present time that the voiced content 123 is scheduled to be delivered. Based on the analysis performed in step 509, in step 511 the recommendation engine 109 may generate a voice recommendation and transmit the voice recommendation to the content provider system 101 wherein the recommendation may be further provided to the synthesis engine 125.

In step 513, of method 500, a determination is made by the content provider system 101 whether or not a modified version of the voiced content 123 using the recommended voice suggested by the recommendation engine 109 of the profile service 103 already exists. This determination may be made to avoid constructing duplications of modified voiced content 123 wherein the same recommended voice may have already been suggested previously and applied to the voiced content 123 for either the same user or another user accessing the content provider system 101. Embodiments of the curation service 121 may search the content repository 122 for one or more saved versions of modified voiced content 123 that includes synthetic speech imitating the recommended voice currently being suggested by the recommendation engine 109. If in step 513 the content provider system 101 determines that there is already an available modified version of the voiced content 123 incorporating the suggested voice, then method 500 may proceed to step 527, wherein the existing version of the voice content 123 comprising artificially created human speech imitating the suggested voice is delivered to the client device 160 at the appropriately scheduled time. Conversely, if a modified version of the voiced content 123 does not currently exist, the method 500 may proceed to step 515.

In step 515 of method 500, a copy of the voiced content 123 being modified by the content provider system 101 may be loaded by the synthesis engine 125. In particular, embodiments of the synthesis engine 125 may load the voiced content 123 being modified into the natural language processor 127. Embodiments of the natural language processor 127, may, in step 517 proceed to parse the audio of the voiced content 123 into raw text. In step 519, using the raw text obtained from the audio of the voiced content 123, the raw text may be further processed to generate a phonetic transcription of the words obtained as raw text from the voiced content 123. Embodiments of the natural language processor 127 may normalize the raw text and assign phonetic transcriptions to each word. The transcriptions may be marked or divided into prosodic units. In some embodiments, the natural language processor 127 may extract the linguistic features of the voiced content 123 from the audio using Hidden Markov Models, mathematical modeling or other techniques described in this disclosure. Moreover, in some embodiments of step 515, the natural language processor may further use POS tagging to identify and understand the characteristics of each word being analyzed and converted into text by the natural language processor 127.

In step 521 of method 500, the synthesis engine 125 may retrieve one or more voice samples 153 comprising the audio waveforms of the voice recommended by the profile service 103. Voice samples 153 may retrieved from the content repository 122 in some embodiments. In alternative embodiments, the voice samples 153 may be accessible via network 150 and remotely stored by one or more data sources 151. The voice samples 153 may be used as training data and/or examples for conditioning the neural networks to generate the waveforms of the modified version of the voiced content 123 having particular characteristics, parameters and sounds akin to the sounds of the human speech presented in the voice samples 153. In step 523, the voice samples 153 and the phonetic transcriptions of the voiced content 123 may be inputted into a neural network, to generate a digitized waveform of the voiced content 123, one sample at a time that mimics human speech of the voice samples 153 and the artificially created speech recites the phonetic transcriptions extracted from the voiced content 123.

In step 525, the waveform may be outputted from the neural network and stored by the content provider system 101. The outputted waveform generated by the neural network may recite the transcript of the voiced content 123 using an artificially synthesized voice that mimics the voice of the person recommended by the profile service 103. In step 525, the curation service 121, in response to the activity of the user and the scheduled delivery of the voiced content 123 may substitute the modified version of the voiced content outputted by the neural network and deliver the modified version of the voiced content to the user's client device 160.

Computer System

FIG. 6 illustrates a depiction of a block diagram of internal and external components of a computer system 600, which may be representative of the one or more computer systems depicted in the computing environment 100, 200, 300 as shown in FIGS. 1-4 in accordance with the embodiments of the present disclosure. It should be appreciated that FIG. 6 provides only an illustration of one implementation and does not imply any limitations with regard to the environments in which different embodiments may be implemented. In general, the components illustrated in FIG. 6 are representative of any electronic device capable of executing machine-readable program instructions. Examples of computer systems, environments, and/or configurations that may be represented by the components illustrated in FIG. 6 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 600 may include communications fabric 602, which provides for communications between one or more processors 603, memory 605, persistent storage 606, communications unit 611, and one or more input/output (I/O) interfaces 613. Communications fabric 602 can be implemented with any architecture designed for passing data and/or control information between processors 603 (such as microprocessors, communications and network processors, etc.), system memory 605, external devices 615, and any other hardware components within a system. For example, communications fabric 602 can be implemented with one or more buses.

Memory 605 and persistent storage 606 may be computer-readable storage media. Embodiments of memory 605 may include random access memory (RAM) 607 and cache 609 memory. In general, memory 605 can include any suitable volatile or non-volatile computer-readable storage media. Software, such as a program 621 may be stored in persistent storage 606 for execution and/or access by one or more of the respective processors 603 via one or more devices of memory 605.

The profile service 103 and content delivery module 104 may be stored in persistent storage 606 and/or in memory 605 for execution by one or more of the respective processors 603 via cache 609. In an embodiment, persistent storage 606 includes a magnetic hard disk. Alternatively, in addition to a magnetic hard disk, persistent storage 606 can include a solid state drive, a semiconductor storage device, read-only memory (ROM), erasable programmable read-only memory (EPROM), flash memory, or any other computer readable storage media that is capable of storing program instructions or digital information. Embodiments of the media used by persistent storage 606 can also be removable. For example, a removable hard drive can be used for persistent storage 606. Other examples include optical and magnetic disks, thumb drives, and smart cards that are inserted into a drive for transfer onto another computer-readable storage medium that is also part of persistent storage 606.

Communications unit 611 provides for communications with other computer systems or devices via a network (e.g., network 150). In the exemplary embodiment, communications unit 611 may include network adapters or interfaces such as a TCP/IP adapter cards, wireless Wi-Fi interface cards, 3G, 4G, or 5G wireless interface cards or other wired or wireless communication links. The network 150 can comprise, for example, copper wires, optical fibers, wireless transmission, routers, firewalls, switches, gateway computers and/or edge servers. Software and data used to practice embodiments of the present invention, including the profile serve 103 and content delivery module 104, can be downloaded to each of the computer systems operating in computing environment 100, 200, 300 or computer system 600 through communications unit 611 (e.g., via the Internet, a local area network or other wide area network). From communications unit 611, the software and data can be loaded onto persistent storage 606.

One or more I/O interfaces 613 may allow for input and output of data with other devices that may be connected to computer system 600. For example, I/O interface 613 can provide a connection to one or more external devices 615 such as one or more audio systems, video systems, sensor devices, input devices such as a keyboard, computer mouse, touch screen, virtual keyboard, touch pad, pointing device, or other human interface devices. External devices 615 can also include portable computer-readable storage media such as, for example, thumb drives, portable optical or magnetic disks, and memory cards. I/O interface 613 may also connect to human-readable display 617. Human-readable display 617 provides a mechanism to display data in a human readable format and can be, for example, a computer monitor or screen. Human-readable display 617 can also be an incorporated display and may function as a touch screen, such as a built-in display of a tablet computer.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the traveler's computer, partly on the traveler's computer, as a stand-alone software package, partly on the traveler's computer and partly on a remote computer or entirely on the remote computer or server. In the latter scenario, the remote computer may be connected to the traveler's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising the steps of:
   receiving a request to deliver voiced content to a user;
   analyzing user profile data associated with the user;
   recommending a voice based on analysis of the user profile, wherein the voice is contextually applicable to the user;
   transcribing the voiced content into text;
   conditioning a neural network using a voice sample of the voice to synthesize a waveform comprising artificial speech reciting the text of the voiced content in an artificially created voice indistinguishable from the voice recommended;
   synthesizing a modified version of the voiced content comprising the waveform; and
   delivering the modified version of the voiced content to the user.

2. The computer-implemented method of claim 1, wherein the user profile data is stored in a database selected from the group consisting of a user context database, user history database and a speech context database.

3. The computer-implemented method of claim 1, wherein the analyzing step is performed by a remotely accessible profile service.

4. The computer-implemented method of claim 2, wherein the user history database comprises a historical bank of voices previously experienced by the user.

5. The computer-implemented method of claim 4, wherein the voice is selected from the historical bank of voices.

6. The computer-implemented method of claim 2, wherein the speech context database comprises a description of an emotional state of the user and the voice is selected in response to the emotional state.

7. The computer-implemented method of claim 2, wherein the user context database identifies a contextual association between the user and recommended voice based on location information, API call, social media or application data.

8. A computer system comprising:
   a processor; and
   a computer-readable storage media coupled to a processor, wherein the computer readable storage media contains program instructions executing a computer-implemented method comprising the steps of:
   receiving a request to deliver voiced content to a user;
   analyzing user profile data associated with the user;
   recommending a voice based on analysis of the user profile, wherein the voice is contextually applicable to the user;
   transcribing the voiced content into text;
   conditioning a neural network using a voice sample of the voice to synthesize a waveform comprising artificial speech reciting the text of the voiced content in an artificially created voice indistinguishable from the voice recommended;
   synthesizing a modified version of the voiced content comprising the waveform; and
   delivering the modified version of the voiced content to the user.

9. The computer system of claim 8, wherein the user profile data is stored in a database selected from the group consisting of a user context database, user history database and a speech context database.

10. The computer system of claim 8, wherein the analyzing step is performed by a remotely accessible profile service.

11. The computer system of claim 9, wherein the user history database comprises a historical bank of voices previously experienced by the user.

12. The computer system of claim 11, wherein the voice is selected from the historical bank of voices.

13. The computer system of claim 9, wherein the speech context database comprises a description of an emotional state of the user and the voice is selected in response to the emotional state.

14. The computer system of claim 9, wherein the user context database identifies a contextual association between the user and the contextually applicable voice based on location information, API call, social media or application data.

15. A computer program product comprising:
    one or more computer readable storage media having computer-readable program instructions stored on the one or more computer readable storage media, said program instructions executes a computer-implemented method comprising the steps of:
    receiving a request to deliver voiced content to a user;
    analyzing user profile data associated with the user;
    recommending a voice based on analysis of the user profile, wherein the voice is contextually applicable to the user;
    transcribing the voiced content into text;
    conditioning a neural network using a voice sample of the voice to synthesize a waveform comprising artificial speech reciting the text of the voiced content in an artificially created voice indistinguishable from the voice recommended;
    synthesizing a modified version of the voiced content comprising the waveform; and
    delivering the modified version of the voiced content to the user.

16. The computer program product of claim 15, wherein the user profile data is stored in a database selected from the group consisting of a user context database, user history database and a speech context database.

17. The computer program product of claim 15, wherein the analyzing step is performed by a remotely accessible profile service.

18. The computer program product of claim 16, wherein the user history database comprises a historical bank of voices previously experienced by the user.

19. The computer program product of claim 18, wherein the voice is selected from the historical bank of voices.

20. The computer program product of claim 16, wherein the speech context database comprises a description of an emotional state of the user and the voice is selected in response to the emotional state.

* * * * *